US012607966B2

(12) United States Patent
Bachmann

(10) Patent No.: US 12,607,966 B2
(45) Date of Patent: Apr. 21, 2026

(54) DEVICE FOR MAINTAINING OR LIMITING THE SHAKE OF A TIMEPIECE COMPONENT

(71) Applicant: ETA SA MANUFACTURE HORLOGERE SUISSE, Grenchen (CH)

(72) Inventor: Stéphane Bachmann, Buren an der Aare (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 279 days.

(21) Appl. No.: 18/287,592

(22) PCT Filed: May 2, 2022

(86) PCT No.: PCT/EP2022/061716

§ 371 (c)(1),
(2) Date: Oct. 19, 2023

(87) PCT Pub. No.: WO2022/233790

PCT Pub. Date: Nov. 10, 2022

(65) Prior Publication Data

US 2024/0201632 A1 Jun. 20, 2024

(30) Foreign Application Priority Data

May 4, 2021 (EP) .................................... 21171958

(51) Int. Cl.
*G04B 43/00* (2006.01)
*G04B 29/04* (2006.01)

(52) U.S. Cl.
CPC ........... *G04B 43/002* (2013.01); *G04B 29/04* (2013.01)

(58) Field of Classification Search
CPC .............................. G04B 29/04; G04B 43/002
See application file for complete search history.

(56) References Cited

U.S. PATENT DOCUMENTS 2,212,535 A 8/1940 Ayres
3,731,482 A * 5/1973 Glanzmann ............ G04B 19/14 968/157

(Continued)

FOREIGN PATENT DOCUMENTS

CH 512097 A 5/1971
CH 540512 A 3/1973

(Continued)

OTHER PUBLICATIONS

International Search Report for PCT/EP2022/061716 dated Jul. 8, 2022.
Written Opinion for PCT/EP2022/061716 dated Jul. 8, 2022.

*Primary Examiner* — Edwin A. Leon
*Assistant Examiner* — Jason M Collins
(74) *Attorney, Agent, or Firm* — Sughrue Mion, PLLC

(57) ABSTRACT

There is provided a device (100) for maintaining or limiting the shake, in at least one direction, of a timepiece component (30) The device includes a stationary structure (20) arranged to abuttingly receive at least one surface of the component (30), and a rotary bolt (10), cooperating with the stationary structure (20). The rotary bolt (10) is rotatable about an axial direction (A) between a first angular position, referred to as the unlocking position, allowing the component (30) freedom of movement and a second angular position, referred to as the locking position, limiting the travel of the component (30) relative to the stationary structure (20) in the at least one direction, and characterised in that the second angular position, referred to as the locking position, of the rotary bolt (10) is secured by a resilient return (3).

27 Claims, 5 Drawing Sheets

(56) References Cited

U.S. PATENT DOCUMENTS

| | | | | |
|---|---|---|---|---|
| 6,295,250 | B1 | 9/2001 | Ray et al. | |
| 8,740,452 | B2 * | 6/2014 | Kaelin | G04B 19/02 368/324 |
| 2004/0062149 | A1 * | 4/2004 | Geyer | G04B 27/004 368/127 |
| 2007/0159931 | A1 * | 7/2007 | Rufenacht | G04B 17/285 368/294 |
| 2014/0313865 | A1 * | 10/2014 | Heise | G04B 17/285 368/130 |
| 2019/0187617 | A1 | 6/2019 | Peter et al. | |

FOREIGN PATENT DOCUMENTS

| | | | |
|---|---|---|---|
| CH | 584 929 | B5 | 2/1977 |
| CH | 599 590 | B5 | 5/1978 |
| EP | 0 028 429 | A1 | 5/1981 |
| EP | 2 793 087 | A1 | 10/2014 |
| EP | 4 057 080 | A1 | 9/2022 |
| JP | 2001-516455 | A | 9/2001 |
| KR | 10-2019-0071587 | A | 6/2019 |
| WO | 03/048871 | A2 | 6/2003 |

* cited by examiner

DEVICE FOR MAINTAINING OR LIMITING THE SHAKE OF A TIMEPIECE COMPONENT

CROSS REFERENCE TO RELATED APPLICATIONS

This application is a National Stage of International Application No. PCT/EP2022/061716 filed May 2, 2022, claiming priority based on European Patent Application No. 21171958.8 filed May 4, 2021.

TECHNICAL FIELD OF THE INVENTION

The invention relates to a device for maintaining or limiting the shake of a timepiece component.

The invention further relates to a horological movement comprising at least one such device for maintaining or limiting shake.

The invention further relates to a timepiece, in particular a watch, comprising at least one such device for maintaining or limiting shake.

The invention relates to the field of timepiece mechanisms, and in particular to means for limiting shake and to means for holding in a clamped position, designed for initial factory setting operations or for setting operations carried out as part of an after-sales service.

TECHNOLOGICAL BACKGROUND

Setting the shake (or clearance) of a timepiece component is always difficult. This is because the very low shake values (or functional plays) are of the same order as the dimensional manufacturing tolerances, or even as the shape tolerances. This problem is further complicated when taking into account thermal stresses, in the case of a watch that must operate between −15° C. and +40° C., for example. This must be dealt with both during the initial factory setting operations when a timepiece is first produced, and throughout its life during after-sales maintenance operations. In particular, some settings are also preferably reversible.

Various means are used by horologists to limit the axial shake of a component, such as cover plates, plates with an eccentric hole, eccentrics, in particular groups of eccentric bolts on the periphery of a component, keys, snap rings, stepped screws or other limiting elements.

These solutions are typically imperfect due to their large overall dimensions, to the fact that they visually obstruct components that must remain visible to the user, or because of the accumulation of shake. Resistance to impacts still often leaves a lot to be desired.

SUMMARY OF THE INVENTION

The invention aims to provide horologists with a simple, reliable, space-saving and reversible mechanism for limiting the axial and/or radial shake of a component.

In one particular embodiment, this mechanism is still able to ensure that the component is held in position, blocking the axial and/or radial movements of the component.

The terms "axial" and "radial" are, of course, defined relative to the given component whose movements are to be limited, and in particular relative to the main axis of a horological movement.

The invention more particularly relates to a device for maintaining or limiting the axial and/or radial shake of a timepiece component, according to claim 1.

In addition to the features mentioned in the preceding paragraph, the device according to the invention can have one or more complementary features from among the following, considered either on an individual basis or according to any combination technically possible:

- said second angular position, referred to as the locking position, of the rotary bolt is a single position, and is defined and indexed by a raised portion that said structure comprises, the raised portion being arranged to cooperate with a boss that said rotary bolt comprises, the cooperation between the boss and the raised portion allowing a stable and secure position of the rotary bolt to be defined in the absence of any action from a user on said rotary bolt;
- the structure comprises at least one angular banking to limit the angular travel of said rotary bolt in at least one direction;
- the structure comprises at least one axial banking arranged to limit the axial travel of said rotary bolt in said axial direction A at least in one direction;
- said device for maintaining or limiting shake is a device for maintaining or limiting shake in the axial direction A, and said rotary bolt is arranged to limit the axial travel of said component in said axial direction A, relative to said stationary structure, when the rotary bolt is in said second angular position, referred to as the locking position;
- the rotary bolt comprises at least one pad arranged to form, when said rotary bolt is in said second angular locking position, an axial banking, in said axial direction A, for said component held captive between said structure and said rotary bolt in order to limit the axial shake of said component in said axial direction A, or a first jaw for holding, by clamping, one said component in cooperation with said structure forming a second jaw opposite said first jaw in order to axially block the component in said axial direction A;
- the device for maintaining or limiting shake is a device for maintaining or limiting radial shake in a second radial direction perpendicular to the axial direction A, and said rotary bolt is arranged to limit the travel of said component relative to said stationary structure in the second radial direction, when the rotary bolt is in said second angular position, referred to as the locking position;
- the rotary bolt comprises at least one pad arranged to form, when said rotary bolt is in said second angular locking position, a radial banking for limiting the radial shake of said component or for radially blocking the component in a second radial direction perpendicular to the first axial direction A, in cooperation with said stationary structure or with a second radially opposite device for maintaining or limiting shake;
- the boss is carried by at least one spring arm which said resilient return means comprise or which forms said resilient return means;
- the boss carries a pin arranged to follow said raised portion;
- the boss comprises a hole forming a gripping member for handling by a horologist or by automated production means;
- the raised portion comprises at least one projection oriented towards the axis of rotation of said rotary bolt and at least one cavity that is further away from the axis of rotation of said rotary bolt than said projection, said cavity cooperating with said boss to form a notch for stabilising said rotary bolt;

- the rotary bolt carries said resilient return means;
- the rotary bolt comprises at least one gripping member arranged to be handled by a horologist or an automated timepiece production means, to control a rotation of said rotary bolt between the first angular position, referred to as the unlocking position, and the second angular position, referred to as the locking position, and to lock and/or unlock said component positioned between said structure and said rotary bolt;
- the gripping member is separate from a boss that said rotary bolt comprises, said gripping member being carried by an arm that is more rigid than said resilient return means;
- the gripping member is rigidly connected to a boss that said rotary bolt comprises, said gripping member being carried by said resilient return means;
- the resilient return means comprise a plurality of strip spring segments in the form of circular arcs joined end-to-end and connected in pairs by loops;
- said rotary bolt is substantially planar, perpendicularly to its axis of rotation;
- the cooperation between said boss and said raised portion is essentially planar, in a plane perpendicular to said axis of rotation of said rotary bolt, and said resilient return means are deformable in an essentially planar manner;
- the cooperation between said boss and said raised portion is essentially non-planar, said raised portion comprising successive zones of variable altitude relative to a plane perpendicular to the axis of rotation of said rotary bolt, and forming at least one notch for stabilising said rotary bolt by holding a front surface of said boss, and said resilient return means are deformable in three-dimensional space;
- the rotary bolt is made in one piece and said resilient return means are integrated into said rotary bolt;

The invention further relates to a system for holding mutually concentric components of a horological movement, comprising at least one such device for maintaining or limiting shake, forming first means for maintaining or limiting the shake of a first component and comprising second means for maintaining or limiting the shake of a second component concentric with the first component.

Advantageously, the second means for maintaining or limiting shake are configured to block or limit the shake or axial play of the second component in the axial direction A and/or radial direction in a plane perpendicular to the axial direction A.

Advantageously, the second means for maintaining or limiting shake are a banking or an eccentric rotary bolt allowing the axial play of the second component to be limited in the axial direction A and/or radial direction in a plane perpendicular to the axial direction A, or allowing the second component to be axially held in the axial direction A and/or radial direction in a plane perpendicular to the axial direction A.

The invention further relates to a horological movement comprising at least one such device for maintaining or limiting shake or one such system for holding concentric components.

The invention further relates to a timepiece, in particular a watch, comprising at least one such device for maintaining or limiting shake or one such system for holding concentric components.

BRIEF DESCRIPTION OF THE FIGURES

The purposes, advantages and features will be better understood upon reading the following detailed description given with reference to the accompanying drawings, in which.

DETAILED DESCRIPTION OF THE INVENTION

Figure 1:
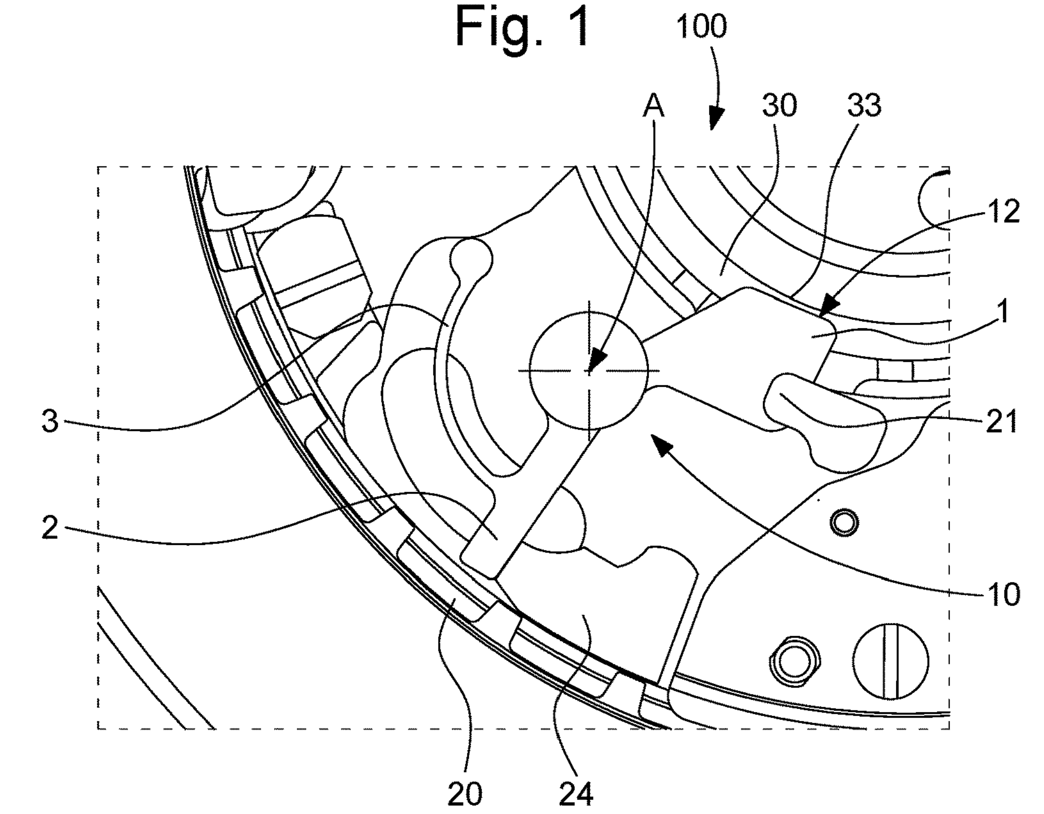
FIG. 1 diagrammatically shows a plan view of an example embodiment of a device for maintaining or limiting shake according to the invention, in a holding position configured to hold a component enclosed, axially and radially, between a lower structure and a pad forming part of a rotary bolt.

The invention relates to a device 100 for maintaining or limiting the axial and/or radial shake of a timepiece component 30.

This device 100 for maintaining or limiting shake comprises a stationary structure 20, which is arranged to abuttingly receive at least one surface of a component 30. The stationary structure 20 cooperates with a rotary bolt 10, which is rotatable about an axial direction A, and which is configured to allow the component 30 freedom of movement when the rotary bolt 10 is in a first angular position, referred to as the unlocking position, and to maintain or limit the shake of the component 30 in at least one direction when the rotary bolt 10 is in a second angular position, referred to as the locking position.

Such a device 100 for maintaining or limiting shake can be used to limit the shake of the component 30 in one or more directions, for example in an axial direction and/or in a radial direction.

In one example embodiment, illustrated in particular with reference to FIGS. 1 to 4, the rotary bolt 10 is arranged in particular to limit the axial travel of the component 30 relative to the stationary structure 20 in the axial direction A, when the rotary bolt 10 is in the second angular position, referred to as the locking position.

According to the invention, when the rotary bolt 10 is in this second angular position, referred to as the locking position, the rotary bolt 10 occupies a specific angular position relative to the stationary structure 20, blocking or limiting the axial shake of the component 30. This second angular position of the rotary bolt 10 is secured by the action of the resilient return means 3. In an advantageous alternative embodiment, these resilient return means 3 are integrated into the rotary bolt 10.

More particularly, but by no means exclusively, the second angular position of the rotary bolt 10 for blocking or limiting the axial shake of the component 30 is a single position or is formed by a set of a plurality of angular positions of the rotary bolt 10 over a given angular sector.

Advantageously, the second angular position of the rotary bolt 10 for blocking or limiting the axial shake of the component 30 is a single position, defined and indexed by a raised portion 25 that the structure 20 comprises, the raised portion 25 being arranged to cooperate with a boss 4 that the rotary bolt 10 comprises, the cooperation between the boss 4 and the raised portion 25 allowing a stable and secure position of the rotary bolt 10 to be defined in the absence of any action from a user on the rotary bolt 10.

The resilient return means 3 define a blocking torque, the specific value whereof is configured to hold the rotary bolt 10 in position and thus secure the component 30, even in the event of an inadvertent movement imparted to the timepiece 2000 integrating this device 100, for example when a watch is dropped.

Only a torque voluntarily imparted by a horologist during an initial setting operation, or during an after-sales operation, or even by a production means such as a robotic manipulator calibrated to the torque, can overcome the blocking torque generated by the resilient return means 3 and disengage the rotary bolt 10 from its locking position, in order to position it in the unlocking position, thus allowing the component 30 to be fully released and removed.

More particularly, the structure 20 comprises at least one angular banking 24, which is arranged to limit the angular travel of the rotary bolt 10 in at least one direction.

More particularly, the structure 20 comprises at least one axial banking 21, which is arranged to limit the axial travel of the rotary bolt 10 in the axial direction A, at least in one direction, in order to prevent excessive angular displacement of the rotary bolt 10 in the event of an impact, for example.

The rotary bolt 10 comprises at least one pad 1, which is arranged so as to form, when the rotary bolt 10 is in the second angular position, referred to as the locking position, an axial banking, in the axial direction A, for a component 30, held captive between the structure 20 and the rotary bolt 10 to limit the axial shake of the component 30.

The pad 1 can also be arranged to form a first jaw for holding the component 30 by clamping, in cooperation with the structure 20 forming a second jaw opposite the first jaw in order to axially block the component 30.

More particularly, the boss 4 is carried by at least one spring arm which the resilient return means 3 comprise or which forms the resilient return means 3. Even more particularly, this spring arm is formed by a single resilient strip carrying the boss 4 at its end.

More particularly, the rotary bolt 10 comprises at least one gripping member 2 arranged to be handled by a horologist or an automated timepiece production means, to control a rotation of the rotary bolt 10 between the first angular position, referred to as the unlocking position, and the second angular position, referred to as the locking position, and to lock and/or unlock the component 30 positioned between the structure 20 and the rotary bolt 10, and more particularly on the structure 20 and under the rotary bolt 10.

In an alternative embodiment illustrated in FIGS. 1 to 4, the gripping member 2 is separate from the boss 4 and is carried by an arm, which is more rigid than the resilient return means 3, which the rotary bolt 10 comprises.

Figure 9:
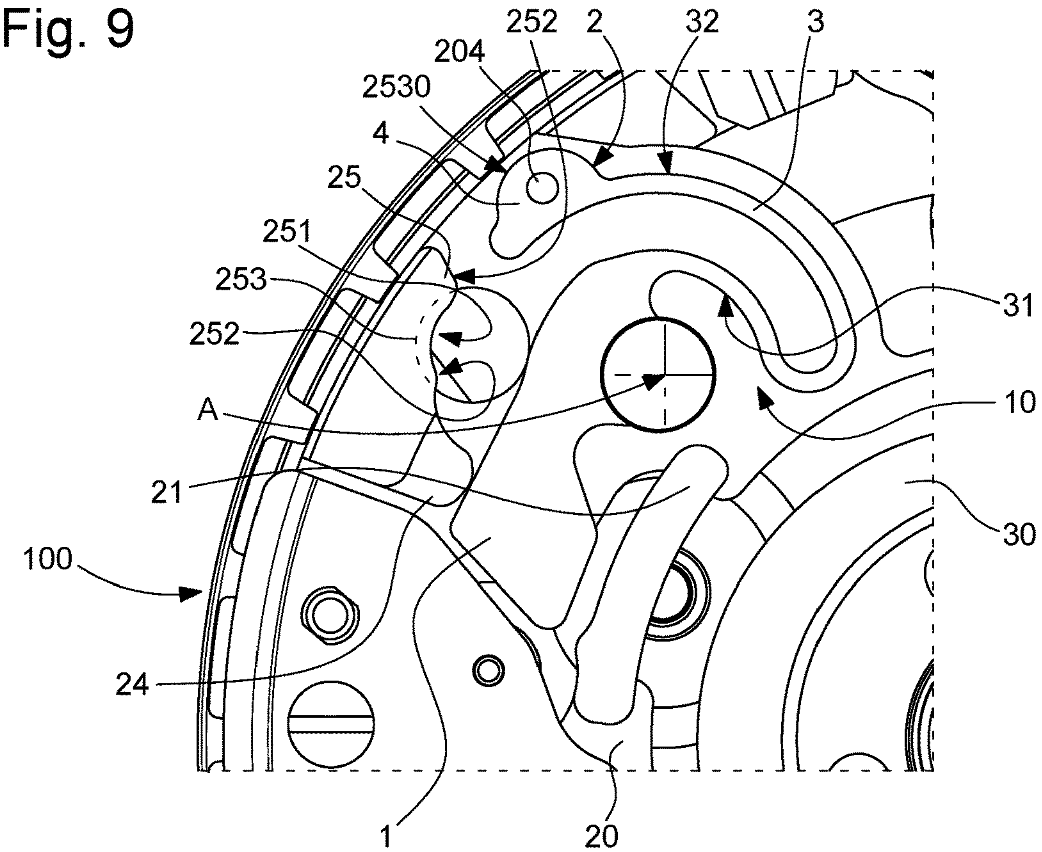
FIGS. 9 and 10 are, similarly to FIGS. 3 and 4, illustrations of a second example embodiment of a device for maintaining or limiting shake according to the invention, in the unlocking and locking positions, wherein the rotary bolt comprises an S-shaped spring arm, the distal end whereof carries the boss, and comprises a hole which is used to operate the rotary bolt; another additional boss, forming a beak at the distal end of the spring, is an axial safety device for limiting any axial displacements during impacts or handling.
Figure 10:
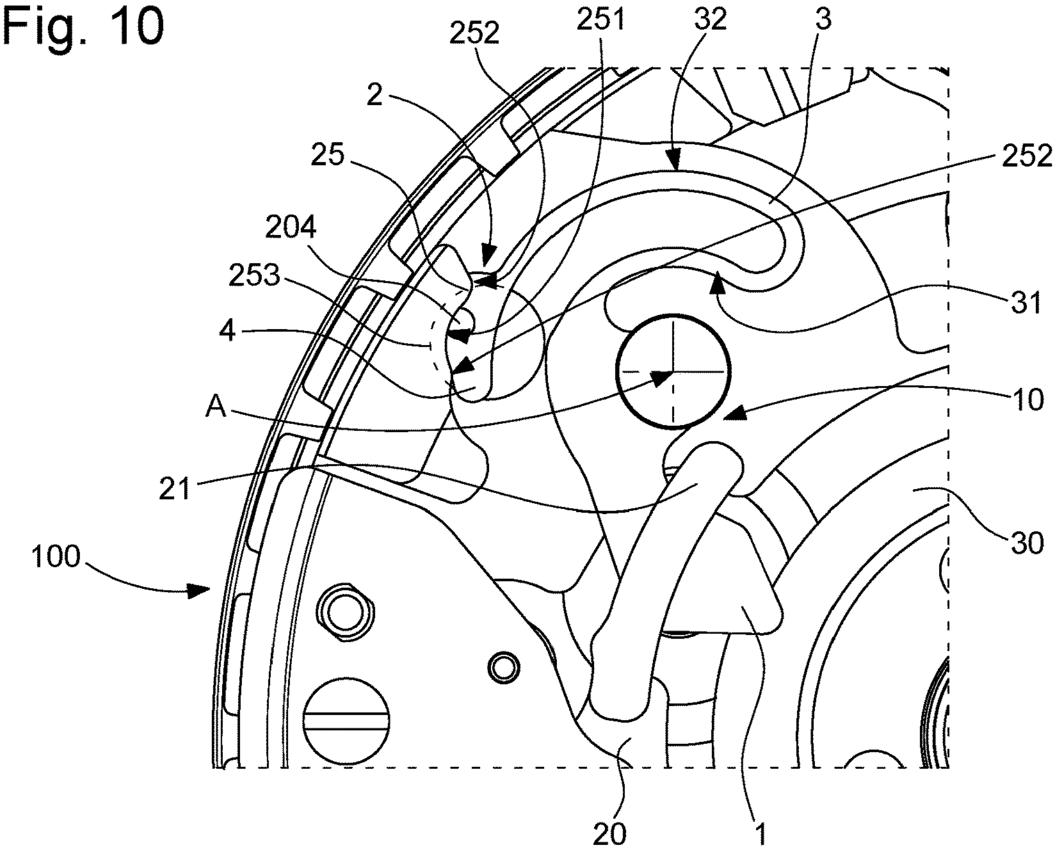

In another alternative embodiment illustrated in FIGS. 9 and 10, the gripping member 2 is rigidly connected to the boss 4 and is carried by the resilient return means 3.

More particularly, as illustrated in the alternative embodiment shown in FIGS. 9 and 10, the boss 4 carries a hole 204, which forms such a gripping member 2, for the operation thereof by a horologist or by automated production means.

More particularly, the boss 4 can also carry a pin, not shown, which is arranged to follow the raised portion 25.

More particularly, the boss 4 comprises a substantially semi-cylindrical peripheral part 2530.

More particularly, the raised portion 25 comprises at least one projection 252, which is oriented towards the axis of rotation of the rotary bolt 10, and at least one cavity 251, 253, which is further away from the axis of rotation of the rotary bolt 10 than the projection 252, and with which this cavity 251, 253 forms a notch for stabilising the rotary bolt 10, the cavity 253 advantageously being of complementary shape to the peripheral part 2530 of the boss 4.

In the alternative embodiment illustrated in FIGS. 9 and 10, the structure 20 forms a cap, to axially cover (by at least one flank defined in particular by the projection 252 and the cavity 251) part of the boss 4, when the peripheral part 2530 of the boss 4 is in contact with the cavity 253. Removing the cavity 251 ensures access to the hole 204, when the boss 4 comprises such a hole, for handling the gripping member 2.

As illustrated in FIGS. 9 and 10, the resilient return means 3 can comprise a plurality of strip spring segments 31, 32 in the form of circular arcs joined end-to-end and connected in pairs by loops. More specifically, these circular arcs are concentric, all centred on the axis of rotation of the rotary bolt 10.

More particularly, the rotary bolt 10 is substantially planar, perpendicularly to its axis of rotation.

More particularly, as can be seen for example in the alternative embodiment shown in FIGS. 1 to 4, the cooperation between the boss 4 and the raised portion 25 is essentially planar, in a plane perpendicular to the axis of rotation of the rotary bolt 10, and the resilient return means 3 are deformable in an essentially planar manner.

Figure 7:
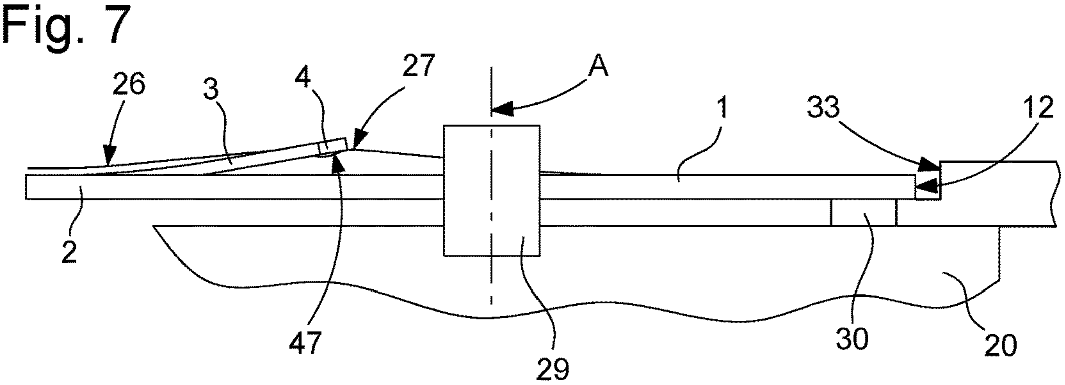
FIGS. 7 and 8 are, when viewed from the side, simple diagrams of example embodiments of a rotary support with a non-planar, deformable spring cooperating with a left profile.
Figure 8:
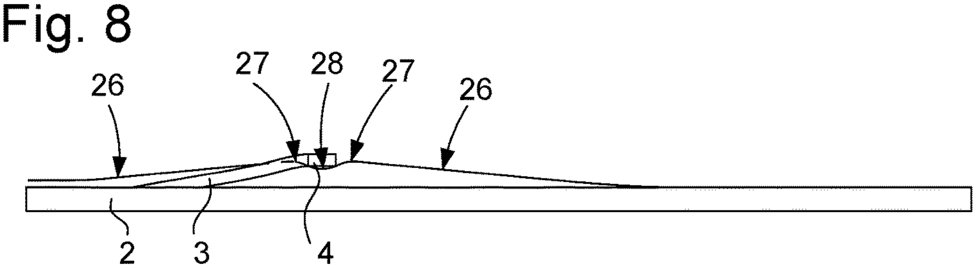
Figure 11:
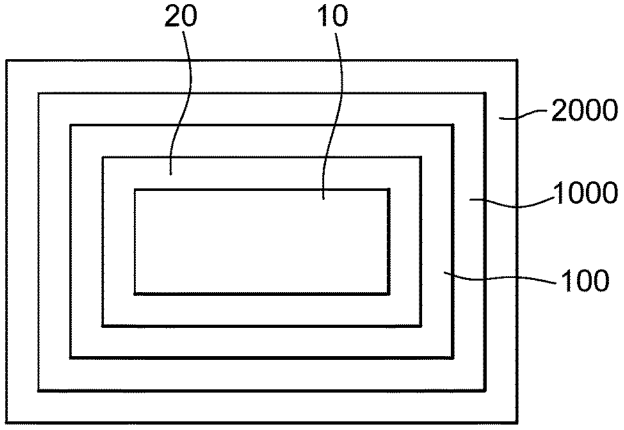
FIG. 11 is a block diagram showing a timepiece comprising a device for maintaining or limiting shake according to the invention.

In another alternative embodiment, for example in the embodiment shown in FIG. 7 or in FIG. 8, the cooperation between the boss 4 and the raised portion 25 is essentially non-planar, the raised portion 25 comprising successive zones 26, 27, 28 of variable altitude relative to a plane perpendicular to the axis of rotation of the rotary bolt 10, and forming at least one notch for stabilising the rotary bolt 10 by holding a front surface 47 of the boss 4, and the resilient return means 3 are deformable in three-dimensional space.

In an advantageous embodiment, the rotary bolt 10 is made in one piece.

It is understood that the principle is that of using the operation of a rotary bolt 10 to limit the shake of a component 30, or to ensure that it is held in place, but by moving the shake-limiting part, formed by the pad 1, and the gripping member 2 forming the actuating part, away from the centre of rotation of the rotary bolt 10.

In this way, the rotary bolt 10 is handled in an accessible area of the movement, while ensuring, where necessary, that an inaccessible component is covered as desired when the bolt is retracted.

Thus, when the rotary bolt 10 is pivoted about its axis of rotation by means of the gripping member 2, the other part of the bolt formed by the pad 1 covers the component 30 to be held, so as to limit the axial displacement thereof (shake, impact) or block the displacement thereof.

Advantageously, the pad 1 of the rotary bolt 10 which covers the component 30 to be held is itself covered by an axial banking 21 rigidly connected to the stationary structure 20, in particular a blank, in order to prevent excessive angular movement of the rotary bolt 10 in the event of an impact, for example.

The resilient return means 3 of the rotary bolt 10 ensure that the rotary bolt 10 is held in its angular locking position.

In one alternative embodiment, the resilient return means 3 of the rotary bolt 10 can also help ensure that the rotary bolt 10 is held in its angular unlocking position.

The positioning of the rotary bolt 10 and the holding thereof in position are thus not managed by friction on pivoting (which is conventionally the case with a bolt or eccentric) but by the effect of the resilient return means 3 which push the rotary bolt 10 into at least one preferred position; in this case, the resilient return means 3 push the gripping member 2 against a rigid banking 24 of the stationary structure 20 by the spring effect of the resilient return means 3. This configuration is illustrated in particular in the alternative embodiments shown in FIGS. 1 to 4.

In order to return to the unlocking position, the force linked to the compression of the resilient return means 3 during the movement of the boss 4 on the raised portion 25, in particular on a projection 252 or the like, as illustrated in the figures, must firstly be overcome. The presence of at least one projection 252 allows the locking position of the rotary bolt 10 to be secured, in particular in the event of any impacts which may occur during the life of the movement.

Such a raised portion of the stationary structure 20 can also be formed so as to cooperate with the boss 4 of the resilient return means 3 when the bolt is in its angular unlocking position, in particular to index and secure these two angular locking and unlocking positions. This ensures that the rotary bolt 10 is correctly positioned.

Overcoming the rise and displacement of the boss 4 at the end of the resilient return means 3 on the projection 252 of the raised portion 25 allows a notch effect to be added, which effect is perceived by the horologist during each handling operation (locking/unlocking, unlocking/locking), thus guaranteeing the open position (unlocking position) or closed position (locking position) of the rotary bolt 10.

It is important to note that the resilient return means 3 do not need to be tensioned when the rotary bolt 10 is in the locking position.

More specifically, if there is play and despite this the rotary bolt 10 carries out its functions to axially limit the component 30, for example a central disc, in the plane, the system will operate just as well, and the raised portion 25 placed between the locked and unlocked positions will always guarantee the position and holding of the rotary bolt in either of its end positions, as well as the notch effect when passing from one of these two end positions to the other.

Figure 6:
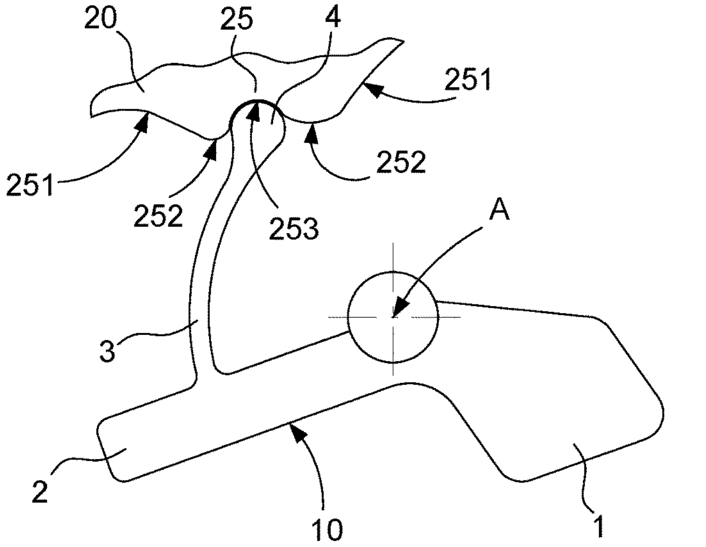
FIG. 6 diagrammatically illustrates an alternative embodiment of the device for maintaining or limiting shake according to the invention, in which the raised portion of the stationary structure comprises two bosses framing a recess defining a clamping notch.

The resilient return means 3 of the rotary bolt 10 can take the form of several alternative embodiments:

- a strip spring working heightwise instead of in the plane, as shown in FIGS. 7 and 8.
- a strip spring cooperating with a negative lug formed by a cavity 253 bordered by two projections 252, which locks the position of the boss 4 by geometric effect: a real block is created, as shown in FIG. 6.

In order to release the rotary bolt 10 from its locking position, a horologist would have to retract the spring manually, which requires access thereto. This is advantageous in that the closed position of the spring is guaranteed, even with a very significant external force.

The device 100 for maintaining or limiting axial shake according to the invention has been described primarily for maintaining or limiting the axial shake of the component 30. However, the device 100 according to the invention is also configured to maintain or limit the radial shake of the component 30, either in addition to maintaining or limiting the axial shake, or alternatively thereto.

Figure 2:
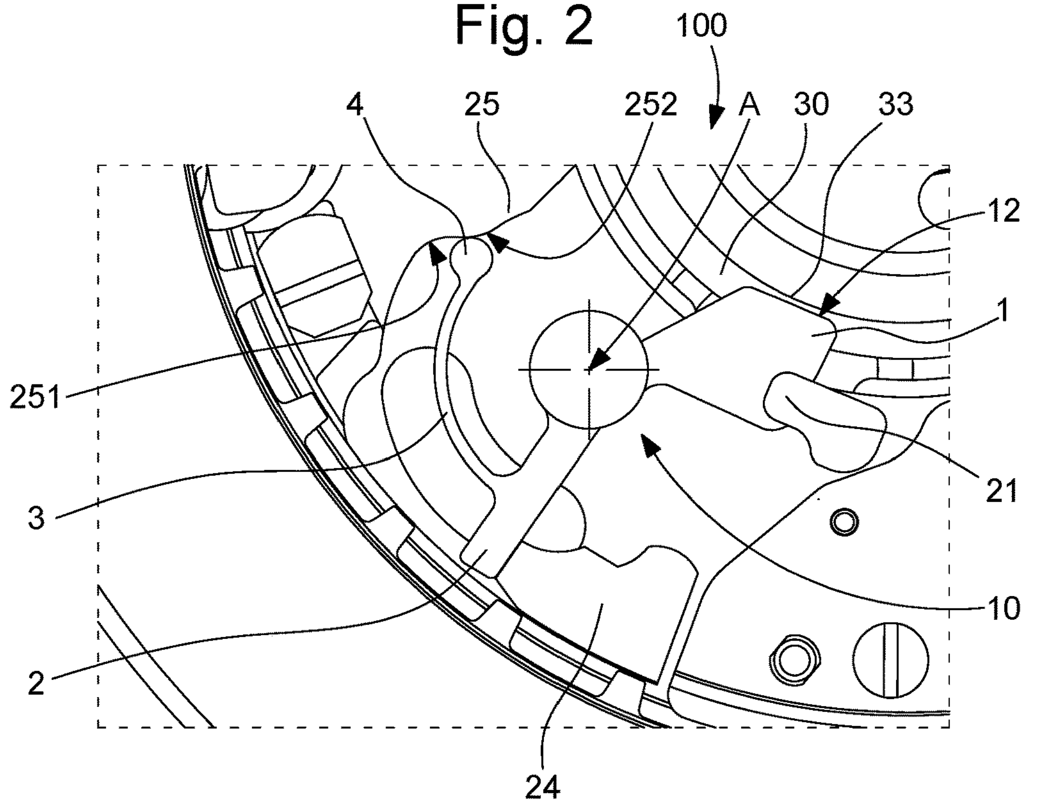
FIG. 2, similarly to FIG. 1, shows the same example embodiment of the device for maintaining or limiting shake according to the invention, in which the rotary bolt can be seen to comprise, at the tip of a spring arm, a boss which cooperates with a raised portion that the stationary structure comprises, in order to immobilise the rotary bolt in an angular clamping position; another rigid arm, which is separate from the spring arm, can be used to operate the rotary bolt.
Figure 3:
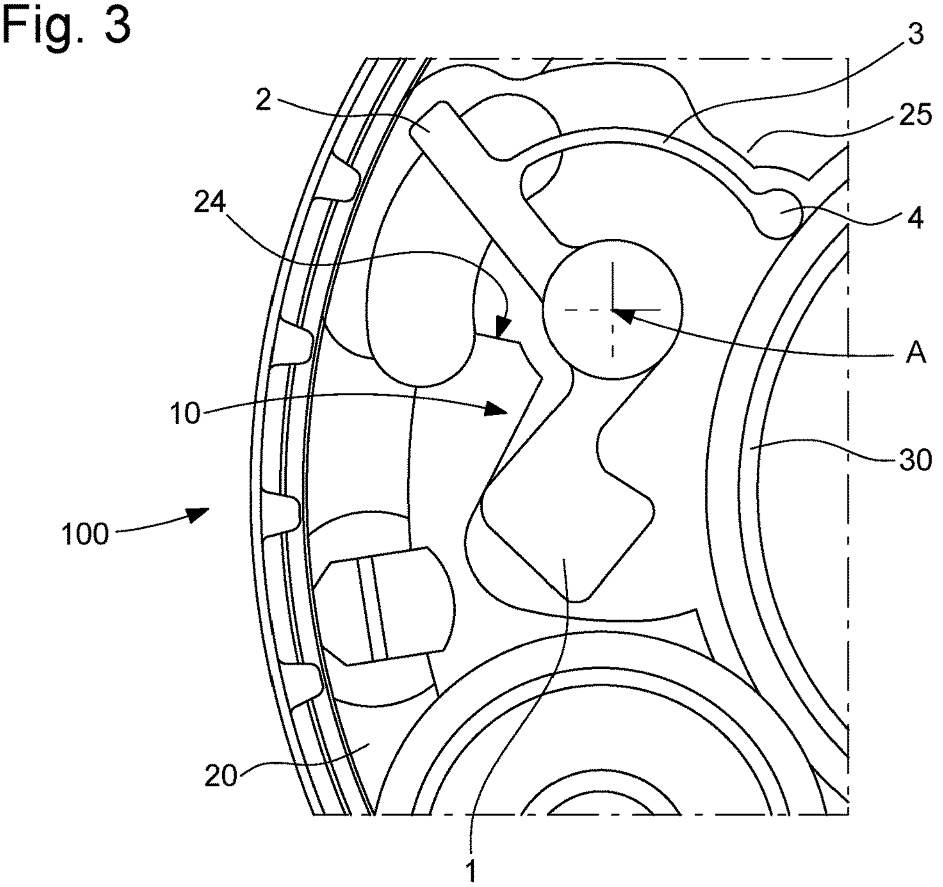
FIG. 3 shows an alternative embodiment of a device for maintaining or limiting shake according to the invention, with the rotary bolt in an unlocking position, such an unlocking position allowing the component to be inserted or extracted; the rotary bolt is free to rotate.
Figure 4:
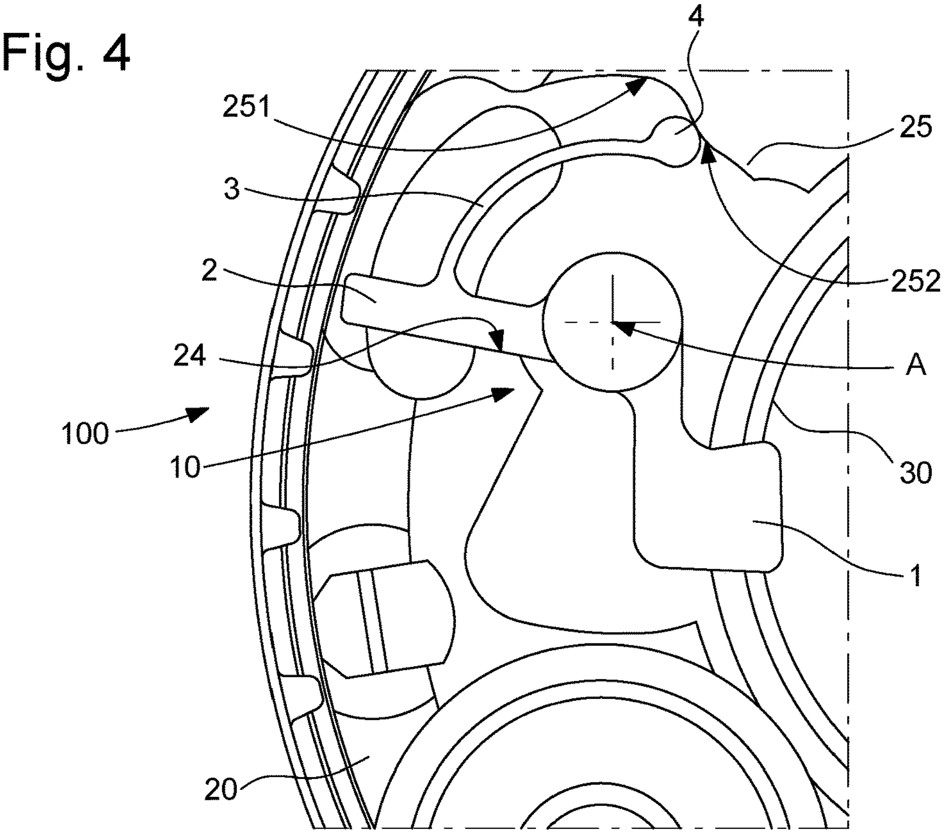
FIG. 4 shows a locking position of the rotary bolt of the device for maintaining or limiting shake illustrated in FIG. 3, such a locking position preventing the component from being inserted or extracted; in this locking position, the rotary bolt is stressed in a counter-clockwise direction by a banking.

As shown more particularly with reference to FIGS. 1, 2 and 7, a portion 12 of the pad 1 of the rotary bolt 10 is configured so as to come, when the rotary bolt 10 is in the locking position, tangentially opposite and close to, or even in contact with, a peripheral portion 33 (illustrated in FIGS. 1, 2 and 7) of the component 30 so as to block or limit the radial movements of the component 30 in a plane perpendicular to the axial direction A.

Preferably, at least two devices 100 are positioned in opposite manners relative to the central axis of the horological movement 1000 in order to block the two directions of radial movement of the component 30, or to limit the radial shake of the component 30.

However, the pad 1 can cooperate with a portion of the stationary structure 20 to block or limit the radial movements of the component 30 in a plane perpendicular to the axial direction A.

Thus, the pad 1 also forms a radial banking capable of blocking or limiting the radial shake of the component 30 in a plane perpendicular to the axial direction A.

Thus, the device 100 according to the invention allows a timepiece component 30 to be axially and/or radially held and/or the axial and/or radial shake thereof to be limited within a horological movement 1000.

Advantageously, a plurality of devices 100 according to the invention are positioned around the component 30, and preferably distributed circumferentially around the component 30.

The invention further relates to a system 500 for holding concentric timepiece components 30, 60 of a horological movement 1000, comprising at least one such device 100 for maintaining or limiting shake, forming first means for maintaining or limiting the shake of a first component 30 and comprising second means 50 for maintaining or limiting the shake of a second component 60 concentric with the first component.

More particularly, the second means 50 for maintaining or limiting shake are configured to block or limit the shake or the axial play in the axial direction A and/or in the radial direction in a plane perpendicular to the axial direction A. The second means 50 for maintaining or limiting shake are, for example, a banking or an eccentric bolt allowing the axial and/or radial play of the second component 60 to be limited, or allowing the second component 60 to be axially and/or radially held.

Figure 5:
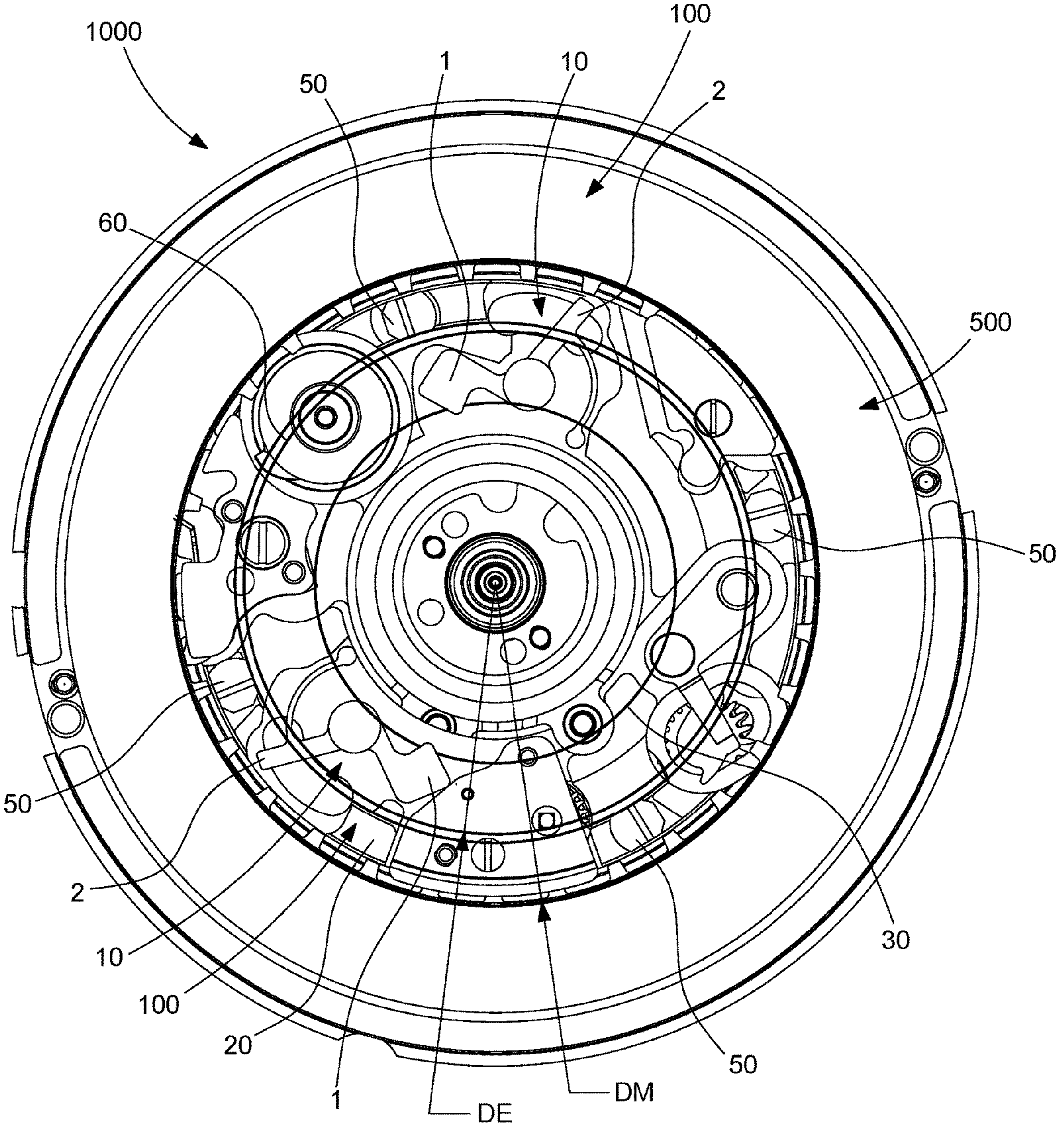
FIG. 5 diagrammatically shows a plan view of a watch movement enclosing a plurality of devices for maintaining or limiting shake according to the invention, which devices are configured to immobilise a component, in this case a central disc, centred on the main axis of the movement; an intermediate disc of larger diameter is held by eccentrics forming second means for maintaining or limiting shake.

FIG. 5 thus illustrates the holding of a first component, in this case a central disc 30, centred on the main axis of the movement, by a plurality of rotary bolts 10 according to the invention, and access to the gripping members 2, in particular the control arms, is made easy through a radial peripheral window; a second component, which is an intermediate disc 60 of larger diameter DE is held by eccentrics 50; the holding of the central disc 30, and of the intermediate disc 60, and the angular displacement of the control arms all take place within a circular zone whose maximum access diameter DM is small compared to the maximum diameter of the blank 20, in the order of two thirds, which allows other mechanisms to be installed around the periphery. The invention thus provides a secure hold while offering a very compact architecture.

The invention further relates to a horological movement 1000 comprising at least one such device 100 for maintaining or limiting shake.

The invention further relates to a timepiece 2000, in particular a watch, comprising at least one such device 100 for maintaining or limiting shake.

To summarise, the invention allows:

- the component to be locked axially despite having no access thereto and limited access in the movement;
- concentric and coaxial wheel sets, such as discs, to be made axially independent;
- shake to be managed better and resistance to impacts to be anticipated;
- the assembly, disassembly and reassembly of the wheel sets to be simplified, in particular in the case of central discs (total access from the dial side with no further disassembly required);
- the bolt to be blocked in its position (closed or open) generated by the rising force of the spring on the lug;
- the open or closed position of the bolt to be guaranteed (while avoiding any intermediate position) thanks to the notch effect generated by the rising of the spring on the lug when the bolt is rotated.

A very simple embodiment can be achieved with a single pin 29 guiding the rotation of a rotary bolt 10.

The invention claimed is:

1. A device (100) for maintaining or limiting the shake, in at least one direction, of a timepiece component (30), said device comprising a stationary structure (20) arranged to abuttingly receive at least one surface of said component (30), and a rotary bolt (10), cooperating with said stationary structure (20), the rotary bolt (10) being rotatable about an axial direction (A) between a first angular position, referred to as the unlocking position, allowing said component (30) freedom of movement and a second angular position, referred to as the locking position, limiting the travel of said component (30) relative to the stationary structure (20) in said at least one direction, wherein said second angular position, referred to as the locking position, of the rotary bolt (10) is secured by resilient return means (3), and said component (30) is, along the axial direction (A), between the rotary bolt (10) and the stationary structure (20) with one surface of the component (30) held in contact with the rotary bolt (10) and with another surface of the component (30), opposite to the one surface of the component (30), held in contact with the stationary structure (20).

2. The device (100) for maintaining or limiting shake according to claim 1, wherein said second angular position, referred to as the locking position, of the rotary bolt (10) is a single position, and is defined and indexed by a raised portion (25) that said stationary structure (20) comprises, the raised portion (25) being arranged to cooperate with a boss (4) that said rotary bolt (10) comprises, the cooperation between the boss (4) and the raised portion (25) allowing a stable and secure position of the rotary bolt (10) to be defined in the absence of any action from a user on said rotary bolt (10).

3. The device (100) for maintaining or limiting shake according to claim 2, wherein said raised portion (25) comprises at least one projection (252) oriented towards an axis of rotation of said rotary bolt (10) and at least one cavity (251, 253) that is further away from the axis of rotation of said rotary bolt (10) than said projection (252), said cavity (251, 253) cooperating with said boss (4) to form a notch for stabilising said rotary bolt (10).

4. The device (100) for maintaining or limiting shake according to claim 2, wherein the cooperation between said boss (4) and said raised portion (25) is essentially planar, in a plane perpendicular to an axis of rotation of said rotary bolt (10), and in that said resilient return means (3) are deformable in an essentially planar manner.

5. The device (100) for maintaining or limiting shake according to claim 2, wherein the cooperation between said boss (4) and said raised portion (25) is essentially non-planar, said raised portion (25) comprising successive zones (26, 27, 28) of variable altitude relative to a plane perpendicular to the axis of rotation of said rotary bolt (10), and forming at least one notch for stabilising said rotary bolt (10) by holding a front surface (47) of said boss (4), and in that said resilient return means (3) are deformable in three-dimensional space.

6. The device (100) for maintaining or limiting shake according to claim 1, wherein said stationary structure (20) comprises at least one angular banking (24) to limit angular travel of said rotary bolt (10) in at least one direction.

7. The device (100) for maintaining or limiting shake according to claim 1, wherein said stationary structure (20) comprises at least one axial banking (21) arranged to limit axial travel of said rotary bolt (10) in said axial direction (A) at least in one direction.

8. The device (100) for maintaining or limiting shake according to claim 1, wherein said device (100) for maintaining or limiting shake is a device for maintaining or limiting shake in the axial direction (A), and in that said rotary bolt (10) is arranged to limit the axial travel of said component (30) in said axial direction (A), relative to said stationary structure (20), when the rotary bolt (10) is in said second angular position, referred to as the locking position.

9. The device (100) for maintaining or limiting shake according to claim 1, wherein said rotary bolt (10) comprises at least one pad (1) arranged to form, when said rotary bolt (10) is in said second angular locking position, either an axial banking, in said axial direction (A), for said component (30) held captive between said stationary structure (20) and said rotary bolt (10) in order to limit the axial shake of said component (30) in said axial direction (A), or a first jaw for holding, by clamping, one said component (30) in cooperation with said stationary structure (20) forming a second jaw opposite said first jaw in order to axially block the component (30) in said axial direction (A).

10. The device (100) for maintaining or limiting shake according to claim 1, wherein said device (100) for maintaining or limiting shake is a device for maintaining or limiting radial shake in a second radial direction perpendicular to the axial direction (A), and in that said rotary bolt (10) is arranged to limit the travel of said component (30) relative to said stationary structure (20) in the second radial direction, when the rotary bolt (10) is in said second angular position, referred to as the locking position.

11. The device (100) for maintaining or limiting shake according to claim 1, wherein said rotary bolt (10) comprises at least one pad (1) arranged to form, when said rotary bolt (10) is in said second angular locking position, a radial banking for limiting the radial shake of said component (30) or for radially blocking the component (30) in a second radial direction perpendicular to the first axial direction (A), in cooperation with said stationary structure (20) or with a second radially opposite device (100) for maintaining or limiting shake.

12. The device (100) for maintaining or limiting shake according to claim 2, wherein said boss (4) is carried by at least one spring arm which said resilient return means (3) comprise or which forms said resilient return means (3).

13. The device (100) for maintaining or limiting shake according to claim 12, wherein said boss (4) carries a pin arranged to follow said raised portion (25).

14. The device (100) for maintaining or limiting shake according to claim 12, wherein said boss (4) comprises a hole (204) forming a gripping member (2) for handling by a horologist or by automated production means.

15. The device (100) for maintaining or limiting shake according to claim 1, wherein said rotary bolt (10) carries said resilient return means (3).

16. The device (100) for maintaining or limiting shake according to claim 1, wherein said rotary bolt (10) comprises at least one gripping member (2) arranged to be handled by a horologist or an automated timepiece production means, to control a rotation of said rotary bolt (10) between the first angular position, referred to as the unlocking position, and the second angular position, referred to as the locking position, and to lock and/or unlock said component (30) positioned between said stationary structure (20) and said rotary bolt (10).

17. The device (100) for maintaining or limiting shake according to claim 16, wherein said gripping member (2) is separate from a boss (4) that said rotary bolt (10) comprises, said gripping member (2) being carried by an arm that is more rigid than said resilient return means (3).

18. The device (100) for maintaining or limiting shake according to claim 16, wherein said gripping member (2) is rigidly connected to a boss (4) that said rotary bolt (10) comprises, said gripping member (2) being carried by said resilient return means (3).

19. The device (100) for maintaining or limiting shake according to claim 1, wherein said resilient return means (3) comprise a plurality of strip spring segments (31, 32) in the form of circular arcs joined end-to-end and connected in pairs by loops.

20. The device (100) for maintaining or limiting shake according to claim 1, wherein said rotary bolt (10) is substantially planar, perpendicularly to its axis of rotation.

21. The device (100) for maintaining or limiting shake according to claim 1, wherein said rotary bolt (10) is made in one piece and in that said resilient return means (3) are integrated into said rotary bolt (10).

22. A holding system (500) for holding concentric timepiece components (30, 60), wherein the holding system (500) comprises at least one device (100), forming first means for maintaining or limiting the shake of a first component (30) and second means (50) for maintaining or limiting the shake of a second component (60) concentric with the first component (30), wherein the device (100) is configured to maintain or limit shake, in at least one direction, of the first component (30), said device comprises a stationary structure (20) arranged to abuttingly receive at least one surface of said first component (30), and a rotary bolt (10), cooperating with said stationary structure (20), the rotary bolt (10) being rotatable about an axial direction (A) between a first angular position, referred to as the unlocking position, allowing said first component (30) freedom of movement and a second angular position, referred to as the locking position, limiting the travel of said first component (30) relative to the stationary structure (20) in said at least one direction, wherein said second angular position, referred to as the locking position, of the rotary bolt (10) is secured by resilient return means (3).

23. The holding system (500) for holding concentric timepiece components (30, 60) according to claim 22, wherein said second means (50) for maintaining or limiting shake are configured to block or limit the shake or the axial and/or radial play of the second component (60).

24. The holding system (500) for holding concentric timepiece components (30, 60) according to claim 22, wherein said second means (50) for maintaining or limiting shake are a banking or an eccentric rotary bolt allowing the axial and/or radial play of the second component (60) to be limited, or allowing the second component (60) to be axially and/or radially held.

25. A horological movement (1000) comprising the at least one device (100) for maintaining or limiting shake according to claim 1.

26. A timepiece (2000) comprising the at least one device (100) for maintaining or limiting shake according to claim 1.

27. A device (100) for maintaining or limiting the shake, in at least one direction, of a timepiece component (30), said device comprising a stationary structure (20) arranged to abuttingly receive at least one surface of said component (30), and a rotary bolt (10), cooperating with said stationary structure (20), the rotary bolt (10) being rotatable about an axial direction (A) between a first angular position, referred to as the unlocking position, allowing said component (30) freedom of movement and a second angular position, referred to as the locking position, limiting the travel of said component (30) relative to the stationary structure (20) in said at least one direction, wherein said second angular position, referred to as the locking position, of the rotary bolt (10) is secured by resilient return means (3), and said device further comprises one of (A), (B), (C), and (D), wherein (A) and (B) comprise said boss (4) being carried by at least one spring arm which said resilient return means (3) comprise or which forms said resilient return means (3), wherein (A) further comprises said boss (4) carrying a pin arranged to follow said raised portion (25), wherein (B) further comprises said boss (4) comprising a hole (204) forming a gripping member (2) for handling by a horologist or by automated production means, wherein (C) comprises said second angular position, referred to as the locking position, of the rotary bolt (10) as a single position, and being defined and indexed by a raised portion (25) that said stationary structure (20) comprises, the raised portion (25) being arranged to cooperate with a boss (4) that said rotary bolt (10) comprises, the cooperation between the boss (4) and the raised portion (25) allowing a stable and secure position of the rotary bolt (10) to be defined in the absence of any action from a user on said rotary bolt (10), and said raised portion (25) comprises at least one projection (252) oriented towards an axis of rotation of said rotary bolt (10) and at least one cavity (251, 253) that is further away from the axis of rotation of said rotary bolt (10) than said projection (252), said cavity (251, 253) cooperating with said boss (4) to form a notch for stabilising said rotary bolt (10), and wherein (D) comprises said rotary bolt (10) comprising at least one gripping member (2) arranged to be handled by a horologist or an automated timepiece production means, to control a rotation of said rotary bolt (10) between the first angular position, referred to as the unlocking position, and the second angular position, referred to as the locking position, and to lock and/or unlock said component (30) positioned between said stationary structure (20) and said rotary bolt (10), and said gripping member (2) is separate from a boss (4) that said rotary bolt (10) comprises, said gripping member (2) being carried by an arm that is more rigid than said resilient return means (3).

* * * * *